June 25, 1940.  H. S. BELL  2,205,643
BRAKE FOR HOISTING REELS
Filed Oct. 17, 1938  2 Sheets-Sheet 1

Hubert S. Bell   INVENTOR.
BY  Jesse R. Stone
    Lester B. Clark
        ATTORNEYS June 25, 1940.  H. S. BELL  2,205,643
BRAKE FOR HOISTING REELS
Filed Oct. 17, 1938  2 Sheets-Sheet 2

Hubert S. Bell INVENTOR.
BY Jesse R. Stone
Lester B. Clark
ATTORNEYS

Patented June 25, 1940

2,205,643

UNITED STATES PATENT OFFICE 2,205,643

BRAKE FOR HOISTING REELS

Hubert S. Bell, Corpus Christi, Tex., assignor of one-half to Walter J. Clay, Houston, Tex.

Application October 17, 1938, Serial No. 235,449

13 Claims. (Cl. 188—77)

My invention relates to a brake construction which may be employed upon reels such as are used in reeling up and unreeling cable so as to raise and lower loads connected with said cable, or which may also be used upon any brakes which retard or stop the movement of a rotating member moving under a load or the inertia of rotation.

In the use of reels for hoisting or pulling, it is desirable that the reel be equipped with a brake drum and brake thereon which will slow down or stop the unreeling of the cable from the drum in handling loads connected with the cable, and it is one of the objects of my invention to provide an efficient type of brake for this purpose which is capable of exerting a maximum of braking effect.

I also desire to provide a brake in which the pressure of the brake band upon the drum shall be approximately equal and uniform throughout the periphery of the drum, and in which a greater area of friction surface may be exerted upon the drum.

It is a further object of the invention to provide a brake which may be applied to a pair of brake drums one on each end of the reel and to readily equalize the braking effect upon both drums simultaneously, both in setting the brakes and also in release thereof. I desire to provide a differential device which may be set at any time during the operation of the drum so that the pull upon the brake bands will be equalized.

It is a further object of the invention to provide means for tightening the brake band upon a brake drum which may be movable relative to the brake band so as to equalize the pressure throughout the length of the brake band.

It is also an object of the invention to provide an improved means for operating the brake band so as to obtain a most efficient application of power to the band and to cause a constriction upon the band instead of the usual pull upon one end thereof.

A further object is to provide a brake band control mechanism to constrict the brake band and in which the effective leverage increases as the constriction progresses.

It is a further object to provide a brake band control mechanism wherein the brake applying member has a rolling action instead of a sliding friction thereby obtaining a high degree of efficiency in the application and release of the brakes.

I also have as an object to provide a brake band which, while in frictional engagement with the drum will release said engagement readily when the drum is rotated in one direction, but in which there is no tendency for release when the drum is rotated in the opposite direction and in which the "kick back" of the brake lever is considerably reduced.

I also aim to provide an operating mechanism, employed where the brakes on a plurality of drums are to be operated simultaneously by the same lever, wherein an equal force may be applied to all bands both in engaging and disengaging the frictional surfaces.

In the drawings herewith,

Figure 1:
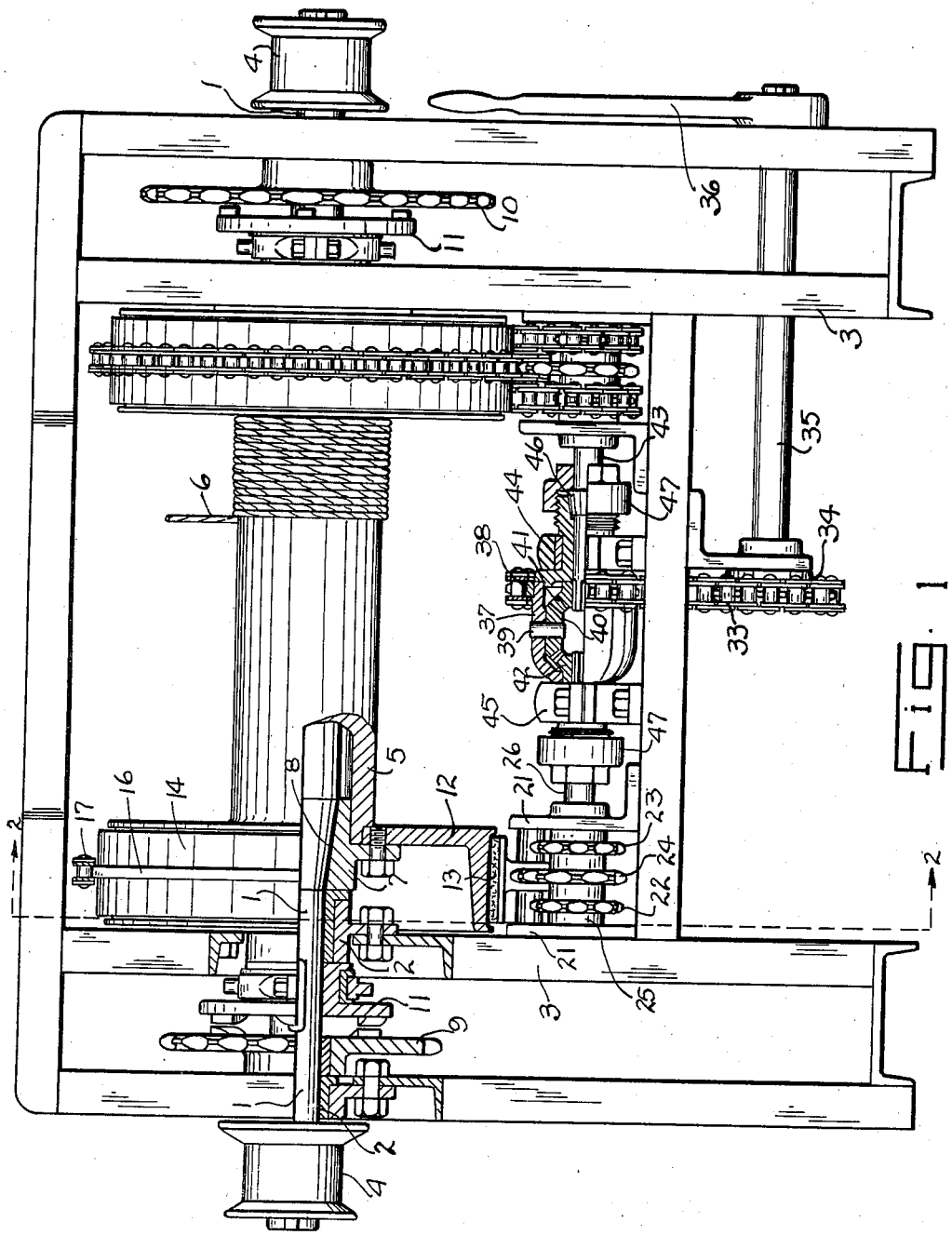
Fig. 1 is a side elevation of a hoisting reel having my invention applied thereto, certain parts being broken away for greater clearness.

My invention is adapted for use generally in applying brake bands to brake drums. It is particularly adapted, however, for use on hoisting apparatus where two brake drums are formed upon each reel. The drawings herewith illustrate its application to such a brake drum installation but I wish it understood that its use is not limited thereto.

In the hoisting reel shown herewith, I have shown a shaft 1 upon which the reel is fixed. Said shaft is mounted in bearings 2 in upright frame members 3. The shaft 1 is shown as being of the greatest diameter between its ends where the reel is attached, the outer ends, which are supported within the bearings 2, being of somewhat smaller diameter. On each end of the shaft I have shown a small reel or cat head 4. The reel which is mounted upon the shaft has a tubular section 5 upon which the cable 6 is to be wound. This cylindrical member is connected at its ends to bushings 7, which are secured detachably to the ends of the cylindrical member and are formed on their inner faces at 8 to fit against the tapered portion of the shaft. It will be understood that the bushings 7 at each end of the drum are of identical construction and that by this means the drum is held against longitudinal movement upon the shaft.

The shaft may be rotated through sprocket wheels 9 and 10, one adjacent each end of the shaft, said sprocket wheels being mounted idly upon the shaft but adapted to be clutched to the shaft through dental clutch members 11. It will be understood that the exact construction of the hoisting reel and the driving sprockets are not essential to the application of my invention to any type of hoisting apparatus.

At each end of the tubular member 5 of the reel I provide a brake drum 12. Said drums are secured to the bushings 7 and interfitted with the tubular reel member 5, as shown in Fig. 1, and are secured thereto by bolts or any other preferred means. Each drum has a cylindrical outer periphery 13 upon which a brake band 14 is adapted to engage.

Figure 2:
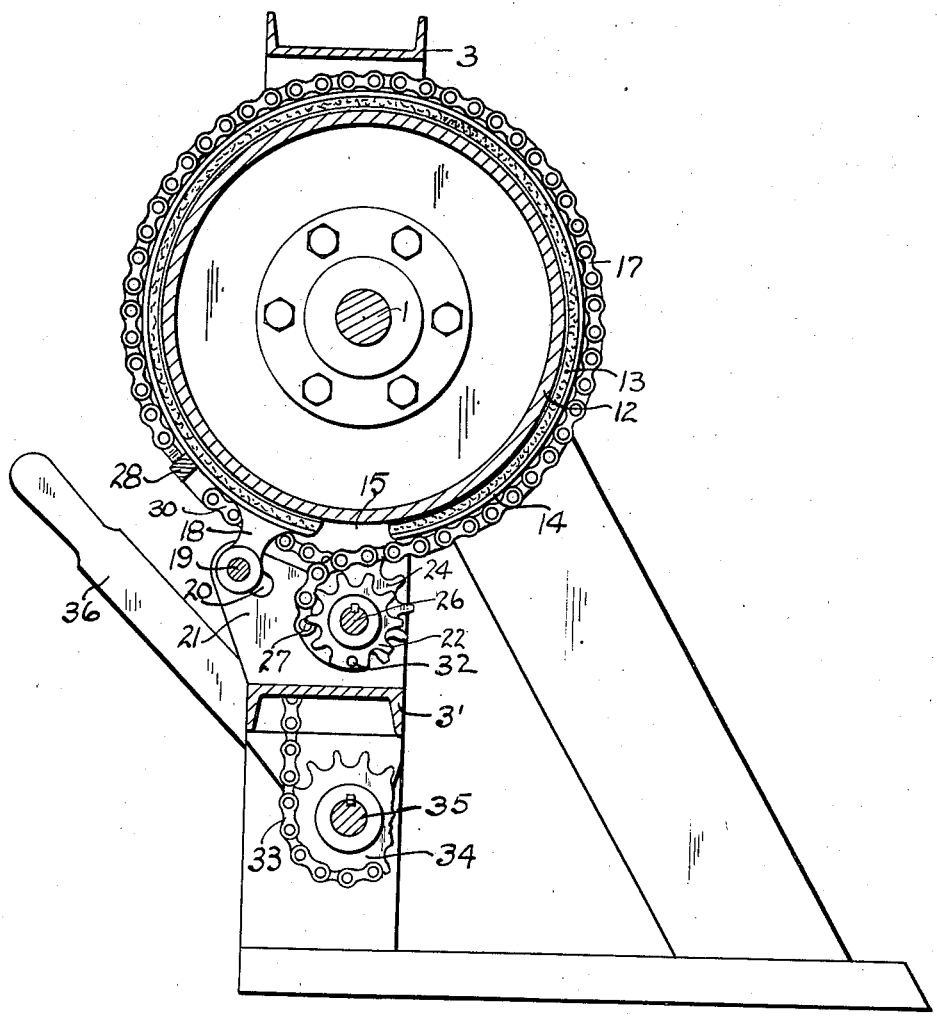
Fig. 2 is a transverse section on the plane 2—2 of Fig. 1.

As will be seen from Fig. 2, the brake band 14 has a brake lining 13 therein, said brake band and lining extending nearly around the total periphery of the brake drum, there being a small gap 15 adjacent the ends of the band. On the outer periphery of the brake band I form a track or raceway 16. I have shown this track as being raised somewhat above the surface of the band so as to provide a convenient construction to receive a sprocket chain 17 adapted to run on said track with a rolling engagement therewith. It will be understood, however, that this track may be constructed in such manner as to conform to the type of flexible member employed in setting the brake.

The brake band is formed at one end with a radially extending post 18, the outer end of which has therethrough a transverse pin 19, which engages within slots 20 in a bracket 21 mounted upon the frame member 3'. It will be understood that there are two of these brackets 21 so that the pin 19 projects laterally from the post to engage within the two opposed openings 20 in the brackets. This serves to limit the movement of one end of the brake band circumferentially around the drum.

Figure 3:
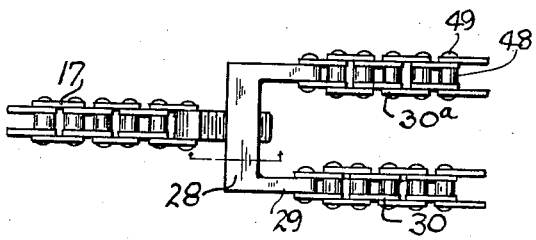
Fig. 3 is an enlarged detail illustrating the construction of one end of the brake operating chain.

The chain 17, which is employed in tightening the brake band, is operated through a plurality of sprocket wheels 22, 23 and 24, which are formed upon a common hub or sleeve 25, said hub being mounted rigidly upon an operating shaft 26. Said shaft is adapted to be rotated as will be later described so as to move said sprocket wheels. The two outer sprockets 22 and 23 are of the same size and are concentric with the shaft. The central sprocket 24, however, is larger than the two side sprockets and is eccentric to the shaft, as will be understood from Figs. 1 and 2. The chain 17 has one end extended around the larger intermediate sprocket. With reference to Fig. 2, it will be seen that the chain is extended around the upper side of said sprocket and secured to a pin 27 on said sprocket wheel. The other end of the chain 17 has, at a point spaced from its end, a yoke 28. This is seen best in Fig. 3. The yoke has two arms 29 thereon to which are attached the chain extensions 30 and 30a. The yoke enables the chain to straddle the post 18 and to engage the two chain extensions 30 and 30a about the two end sprocket wheels 22 and 23. The sprocket chains 30 and 30a are extended around the end sprocket wheels engaging over the upper side thereof and the end links are secured to pins or posts 32 upon said sprocket wheels.

The shaft 26 is adapted to be rotated through a chain 33 secured about a sprocket wheel 34, mounted upon the lever shaft 35. Said lever shaft is mounted in uprights in the frame 3 and has at one end an operating lever 36 fixed to said shaft. It will be understood that by the operation of this lever the sprocket wheel 34 may be rotated.

The connection between the chain 33 and the shaft 26 is by way of a differential device. This differential is similar to the differential employed on motor vehicles. There is an outer housing 37, upon which the sprocket wheel 36 is mounted. The housing 37 carries one or more shafts 39 carrying beveled pinions 40. The said pinion 40 engages with a gear 41 on one side and a gear 42 on the other, said gear 41 being mounted upon a shaft 43, while the gear 42 is mounted upon the end of the shaft 26. The housing 37 is extended at one side and has a bearing at 44 upon the framework. The pinion 42 is mounted upon a sleeve which extends laterally and has a bearing at 45 also on the framework. Both the laterally extending sleeves are adapted to be fixed to their respective shafts by the engagement of the ends of said sleeves with a tapered collar 46, mounted slidably upon the shaft. A threaded nut 47 adjacent said bushing may be employed to force the collar into tight frictional contact with the shaft and the sleeve so as to fix the sleeve to the shaft. Thus where there is a pull upon the reel, tending to exert a pull upon the sprocket wheels and the shaft, the pull upon the brake bands at each end will be equalized and when so equalized the nuts 47 may be tightened to fix the differential tightly to the shaft so that the two shafts 43 and 26 will be rigidly connected. If at any time, due to wear in operation, the brake bands are not equalized they may be again set by simply loosening the nuts 47, allowing the two shafts to come to an equalized position, and then again tightening the nuts 47.

The chain is constructed with rollers 48 having a bearing upon the through pins 49 so that said rollers will engage the trackway 16 with a rolling action which will materially reduce the amount of friction thereon. This produces an even and uniform pressure upon the band throughout its length. The sliding action of the brake band upon the drum, necessary where the band is tightened by a pull upon one end, is avoided. While I have illustrated a chain as the preferred form of brake tightening flexible member, it is obvious that cables and the like may be employed and where the word "chain" is employed herein other flexible members are also contemplated.

When the brake is loose, as seen in Fig. 2, the inner surface of the lining will be spaced slightly from the drum. As the shaft 26 is rotated in a counter-clockwise direction as seen in that view the pull exerted upon that end of the chain will be rapid at first due to the longer weight arm between shaft 25 and the periphery of the sprocket 24 engaged by the chain. But as the sprocket rotates the weight arm decreases until the short weight arm engages the chain. The leverage will increase as the rate of movement of the chain decreases. Thus the strongest leverage is obtained at the point where the brake is set.

There is also a more important mechanical advantage obtained with my brake setting mechanism. This lies in the comparison between the large sprocket 24 and the small sprockets 22 and 23. It will be noted that we have here the principle of a "differential pulley," or chain hoist. The common use of this principle in a chain hoist includes two pulleys fixed on one rotatable shaft, one pulley being slightly larger than the other. This assembly is supported upon a fixed support while an endless chain is run over both pulleys. One loop of the chain includes a load supporting block for lifting loads, while the other loop hangs freely.

The chain is wound up on one pulley while it is unwound from the other. If the difference in diameters of the two fixed pulleys is small the advantage in lifting loads is great. It is the same as though the upper portions of the chain were wound about a shaft whose radius is the radius of the larger pulley minus the radius of the smaller pulley. Hence the greater the difference the less the leverage advantage. With reference to Fig. 2 it will be seen that the larger eccentric sprocket 24 has its larger radius presented upwardly and the upper portion is in engagement with the chain 17. Thus the radius of the sprocket wheel 24 gradually decreases where it contacts with the chain, while the radius of the two wheels 22, which are concentric with the shaft, remain constant. The radius of the large sprocket measuring from the shaft to the teeth engaging the chains, gradually approaches in length the radii of the smaller sprockets. In this instance the difference between the radius of the large sprocket as compared with the radius of the small sprockets decreases as the brake band is tightened and at the point where the brake band is set the radii are nearly equal, hence a great mechanical advantage in applying the brake results.

The rotation of the shaft 26 through the operation of the brake lever 36 will be clear from the drawings. When the shafts 26 and 43 are rotated a pull will be exerted upon the chain through the sprocket wheel 24 to tighten the band upon the drum. This rotation of the shaft will, however, serve to unreel the chain from the small sprockets 22 and 23. This release of the chain at one end will be appreciably slower than the tightening of the same at the other end. The result will be that the chain will have a circumferential sliding movement around the trackway on the brake band and will tighten uniformly all the way around the band and exert a uniform pressure upon the brake band in an inwardly radial direction.

What is claimed is:

1. A brake for draw works and the like including a frame, a reel mounted for rotation therein, a brake drum on said reel, a brake band on said brake drum, a trackway on the outer face of said brake band, said trackway comprising a ridge formed along the median line of said band, a flexible member engaging about said trackway, and means to tighten said flexible member on said brake band, said member having relative longitudinal movement along said brake band.

2. A brake drum, a brake band extending around said drum, a trackway including a radial rib fixed on the outer periphery of said band, a chain running on said trackway, a shaft, and means thereon engaging said chain to move said chain slidable upon said trackway and tighten said brake band, said band when moved into contact with said drum being stationary, and having no longitudinal pull thereon.

3. A hoisting reel, a brake drum thereon, a brake band on said drum, a chain engaging movably about said brake band, a shaft parallel with the axis of said reel, a plurality of sprocket wheels fixed on said shaft, one of said sprockets being of larger diameter than the others, one end of said chain engaging over said larger sprocket and the other end of said chain engaging over a smaller sprocket in such manner that the chain will be unreeled from one sprocket as it reeled up on the other, and means to rotate said shaft to tighten upon the end of the chain engaging said larger sprocket and to let out the chain upon said smaller sprocket, whereby said chain travels circumferentially of said band as it shortened in effective length relative to said band.

4. A hoisting reel, a brake drum thereon, a brake band on said drum, a chain engaging slidably about said brake band, a shaft parallel with the axis of said reel, a plurality of sprocket wheels fixed on said shaft, one of said sprockets being of larger diameter than the others, one end of said chain engaging over the upper side of said larger sprocket, the other end of said chain engaging over the upper side of a smaller sprocket whereby, when said shaft is rotated to exert a pull through the larger sprocket, the chain will be unwound from said smaller sprocket but at a rate slower than the rate of tightening by said larger sprocket.

5. A hoisting reel, a brake drum thereon, a brake band on said drum, a trackway on said band, a flexible line about said band and slidable on said trackway, and means to exert a pull upon one end of said line to tighten said band on said drum including a shaft, a wheel fixed thereon, said line being engaged over the upper side of, and a wheel of smaller diameter fixed to said shaft and having the other end of said line engage over the upper side thereof.

6. A hoisting reel, a brake drum thereon, a brake band on said drum, a raised trackway on said band, a chain slidable on said trackway about said drum, a shaft, a large sprocket and a small sprocket fixed to said shaft, one of said chain being engaged about the upper side of said larger sprocket and the other engaged about the upper side of said small sprocket, said large sprocket being eccentric upon said shaft and arranged to engage said chain with its shorter side as said shaft is rotated to set said brake, and means to rotate said shaft.

7. A brake drum, a brake band thereon, a trackway on said band, a chain engaging about said band and movable upon said trackway, and means to loosen one end of said chain and simultaneously pull upon the other end at a faster rate than said first end is loosened thus constricting said chain upon said band and causing longitudinal translation of said chain relative to said band.

8. A brake drum, a brake band thereon, a trackway on said band, a chain on said trackway, a shaft parallel with the axis to said drum, a large and a small sprocket fixed to said shaft, said large sprocket being eccentric, said chain having one end engaging over the upper side of said larger sprocket the other end of said chain engaging over the upper side of said smaller sprocket, means to rotate said shaft, the eccentricity of said larger sprocket being such that the radius from the shaft to the periphery of the said larger sprocket will constantly approach the length of the radius of the smaller sprocket as said shaft is rotated in a direction to tighten said band.

9. A hoisting reel, a pair of brake drums thereon, brake bands on said drums, a pair of shafts parallel with said reel, said shafts being coaxial, a differential connecting the adjacent ends of said shafts, means to release, adjust, and set the connection between said differential and said shafts, a set of sprockets on each of said shafts and a chain engaging said sprockets and engaged about it against said band to tighten said drum, and means to rotate said shafts as a unit.

10. A hoisting reel, brake drums on the ends thereof, a brake band on each drum, a chain slidably engaging about each brake band, two shafts coaxial with each other adjacent said reel, a plurality of sprockets fixed on each shaft cooperating with the ends of said chains to operate said brake bands, a differential housing about the adjacent ends of said coaxial shafts, a differential mechanism in said housing including sleeves on said shafts, means to adjustably fix said sleeves to said shafts to cause them to rotate as a unit, and means to rotate said housing and said shafts.

11. A brake operating shaft, sprockets on the ends thereof, said shaft being transversely divided between its ends into two sections, sleeves rotatably mounted on the adjacent ends of said sections, a bevel gear on each of said adjacent ends, a differential housing about said gears, a bevel gear on said housing engaging the first mentioned bevel gears, means to rotate said housing and means to adjustably secure said sleeves to said shaft.

12. A brake drum, a brake band on said drum, a trackway along the median line of said band, a chain slidable on said trackway and centered thereby, said band being free of longitudinal strain thereon from said chain, means to exert a pull upon said chain to cause it to slide longitudinally upon said band and to tighten said chain upon and set said band against said drum.

13. A brake drum, a brake band on said drum, means to anchor one end of said band to prevent movement of said band with said drum, and means freely movable circumferentially relative to said band to engage the periphery of said band and force it frictionally against said drum, said band being free of longitudinal strain by said chain.

HUBERT S. BELL.